United States Patent
Long et al.

(10) Patent No.: US 11,147,206 B2
(45) Date of Patent: Oct. 19, 2021

(54) SYSTEM AND METHOD FOR MONITORING THE FRAME LEVELNESS OF AN AGRICULTURAL IMPLEMENT BASED ON SEEDBED FLOOR DATA

(71) Applicant: CNH Industrial Canada, Ltd., Saskatoon (CA)

(72) Inventors: David Long, Washington, IL (US); James W. Henry, Saskatoon (CA); Nicholas Nahuel-Andrejuk, Normal, IL (US)

(73) Assignee: CNH Industrial Canada, Ltd., Saskatoon (CA)

( * ) Notice: Subject to any disclaimer, the term of this patent is extended or adjusted under 35 U.S.C. 154(b) by 170 days.

(21) Appl. No.: 16/276,841

(22) Filed: Feb. 15, 2019

(65) Prior Publication Data
US 2020/0260632 A1 Aug. 20, 2020

(51) Int. Cl.
| | |
|---|---|
| *A01B 79/00* | (2006.01) |
| *A01B 63/16* | (2006.01) |
| *A01B 63/14* | (2006.01) |
| *A01B 15/14* | (2006.01) |
| *A01B 5/04* | (2006.01) |
| *A01B 49/02* | (2006.01) |
| *A01B 63/22* | (2006.01) |

(52) U.S. Cl.
CPC .............. *A01B 79/005* (2013.01); *A01B 5/04* (2013.01); *A01B 15/14* (2013.01); *A01B 63/14* (2013.01); *A01B 63/16* (2013.01); *A01B 49/027* (2013.01); *A01B 63/22* (2013.01)

(58) Field of Classification Search
CPC ......... A01B 5/04; A01B 15/14; A01B 49/027; A01B 63/114; A01B 63/14; A01B 63/16; A01B 63/22; A01B 63/32; A01B 79/005
See application file for complete search history.

(56) References Cited

U.S. PATENT DOCUMENTS

| | | |
|---|---|---|
| 4,600,060 A | 7/1986 | Winter et al. |
| 4,914,593 A | 4/1990 | Middleton et al. |
| 5,033,397 A | 7/1991 | Colburn |

(Continued)

OTHER PUBLICATIONS

Hemmat et al., Development and Field Testing of an Integrated Sensor for On-The-Go Measurement of Soil Mechanical Resistance, Sensors and Actuators A: Physical vol. 198, Aug. 15, 2013.

*Primary Examiner* — Gary S Hartmann
(74) *Attorney, Agent, or Firm* — Rebecca L. Henkel; Rickard K. DeMille

(57) ABSTRACT

In one aspect, a system for monitoring the frame levelness of an agricultural implement may include an implement frame and first and second seedbed detection assemblies coupled to the implement frame. Each of the seedbed detection assemblies may include a seedbed tool configured to ride along a seedbed floor as the implement frame is moved across a field in a forward travel direction. Each of the seedbed detection assemblies may also include a seedbed floor sensor configured to capture data indicative of a position of the corresponding seedbed tool relative to the implement frame. Furthermore, the system may include a controller configured to monitor positions of the seedbed detection assemblies relative to the implement frame based on data received from the seedbed floor sensors of the first and second seedbed detection assemblies, respectively.

13 Claims, 7 Drawing Sheets

(56) References Cited

U.S. PATENT DOCUMENTS

| | | | |
|---|---|---|---|
| 5,524,560 | A | 6/1996 | Carter |
| 6,382,326 | B1 | 5/2002 | Goins et al. |
| 6,389,999 | B1 | 5/2002 | Duello |
| 8,162,070 | B2 | 4/2012 | Smith et al. |
| 8,448,717 | B2 | 5/2013 | Adams et al. |
| 8,522,889 | B2 | 9/2013 | Adams et al. |
| 8,909,436 | B2 * | 12/2014 | Achen .................... A01B 49/06 701/50 |
| 9,664,249 | B2 | 5/2017 | Kowalchuk |
| 9,693,496 | B2 | 7/2017 | Tevs et al. |
| 9,814,172 | B2 | 11/2017 | Achen et al. |
| 9,826,677 | B2 | 11/2017 | Gervais et al. |
| 9,883,626 | B2 | 2/2018 | Heim et al. |
| 9,891,155 | B2 | 2/2018 | Eising |
| 10,071,610 | B2 | 9/2018 | Tuttle |
| 10,080,323 | B2 | 9/2018 | Lund et al. |
| 10,440,876 | B2 * | 10/2019 | Sporrer .................... A01B 5/04 |
| 10,462,966 | B2 * | 11/2019 | Smith .................... A01D 41/14 |
| 10,750,653 | B2 * | 8/2020 | Sporrer ................ A01B 63/008 |
| 10,750,656 | B2 * | 8/2020 | Stanhope ................ A01B 35/08 |
| 10,813,272 | B2 * | 10/2020 | Stanhope ............. A01B 79/005 |
| 10,838,432 | B2 * | 11/2020 | Barrick ................ A01B 79/005 |
| 2013/0032363 | A1 | 2/2013 | Curry et al. |
| 2019/0216005 | A1 * | 7/2019 | Bassett ................ A01B 79/005 |
| 2019/0246548 | A1 * | 8/2019 | Kovach .................... A01B 3/24 |
| 2020/0060062 | A1 * | 2/2020 | Sporrer ............... A01B 63/1112 |
| 2020/0146207 | A1 * | 5/2020 | Long ...................... A01C 5/068 |
| 2020/0221627 | A1 * | 7/2020 | Kovach ................ A01B 79/005 |
| 2020/0221628 | A1 * | 7/2020 | Blunier ............... A01B 73/046 |

* cited by examiner

SYSTEM AND METHOD FOR MONITORING THE FRAME LEVELNESS OF AN AGRICULTURAL IMPLEMENT BASED ON SEEDBED FLOOR DATA

FIELD OF THE INVENTION

The present disclosure generally relates to agricultural implements and, more particularly, to systems and methods for monitoring the frame levelness of an agricultural implement when performing field operations (e.g. tillage operations) based on the positions of a plurality of seedbed floor detection assemblies.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. As such, the tillage implement typically includes a plurality of wheels to facilitate towing of the implement. The wheels may be mounted at various locations on a frame of the implement to support the implement relative to the ground. Additionally, tillage implements generally include a plurality of ground-engaging tools coupled to the frame that are configured to penetrate the soil to a particular depth. The ground-engaging tools may be spaced apart from each other on the frame to provide uniform tilling to the swath of the field over which the implement is towed.

When performing a tillage operation, it is desirable to create a level and uniform layer of tilled soil across the field to form a proper seedbed for subsequent planting operations. However, variations in the operating parameters of the implement and/or the soil conditions within the field may cause the implement frame to pitch, roll, or otherwise be out-of-level relative to the ground. In such instances, the ground-engaging tools mounted on the frame may penetrate the ground to differing depths, thereby resulting in an uneven seedbed. Such poor seedbed conditions can result in a subsequent loss in the crop yield, such as due to poor germination and/or non-uniform plant stands.

Accordingly, an improved system and method for the monitoring frame levelness of an agricultural implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for monitoring the frame levelness of an agricultural implement. The system may include an implement frame and first and second seedbed detection assemblies coupled to the implement frame. Each of the first and second seedbed detection assemblies may include a seedbed tool configured to ride along a seedbed floor as the implement frame is moved across a field in a forward travel direction, with the seedbed extending downwardly within the field from an outer seedbed surface to the seedbed floor. Each of the first and second seedbed detection assemblies may also include a seedbed floor sensor configured to capture data indicative of a position of the corresponding seedbed tool relative to the implement frame. Furthermore, the system may include a controller communicatively coupled to the seedbed floor sensors of the first and second seedbed detection assemblies. The controller may be configured to monitor positions of the first and second seedbed detection assemblies relative to the implement frame based on data received from the seedbed floor sensors of the first and second seedbed detection assemblies, respectively.

In another aspect, the present subject matter is directed to a method for monitoring the frame levelness of an agricultural implement. The agricultural implement may include a frame and first and second seedbed detection assemblies coupled to the implement frame. Each of the first and second seedbed detection assemblies may, in turn, include a seedbed tool configured to ride along a seedbed floor as the agricultural implement is moved across the field in a forward travel direction. The method may include monitoring, with a computing device, positions of the first and second seedbed detection assemblies relative to the frame based on data received from seedbed floor sensors of the first and second seedbed detection assemblies, respectively. When a differential between the monitored positions of the first and second seedbed detection assemblies exceeds a predetermined differential threshold, the method may include determining, with the computing device, that the frame is out-of-level. Additionally, when it is determined that the frame is out-of-level, the method may include initiating, with the computing device, a control action associated with leveling the frame.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
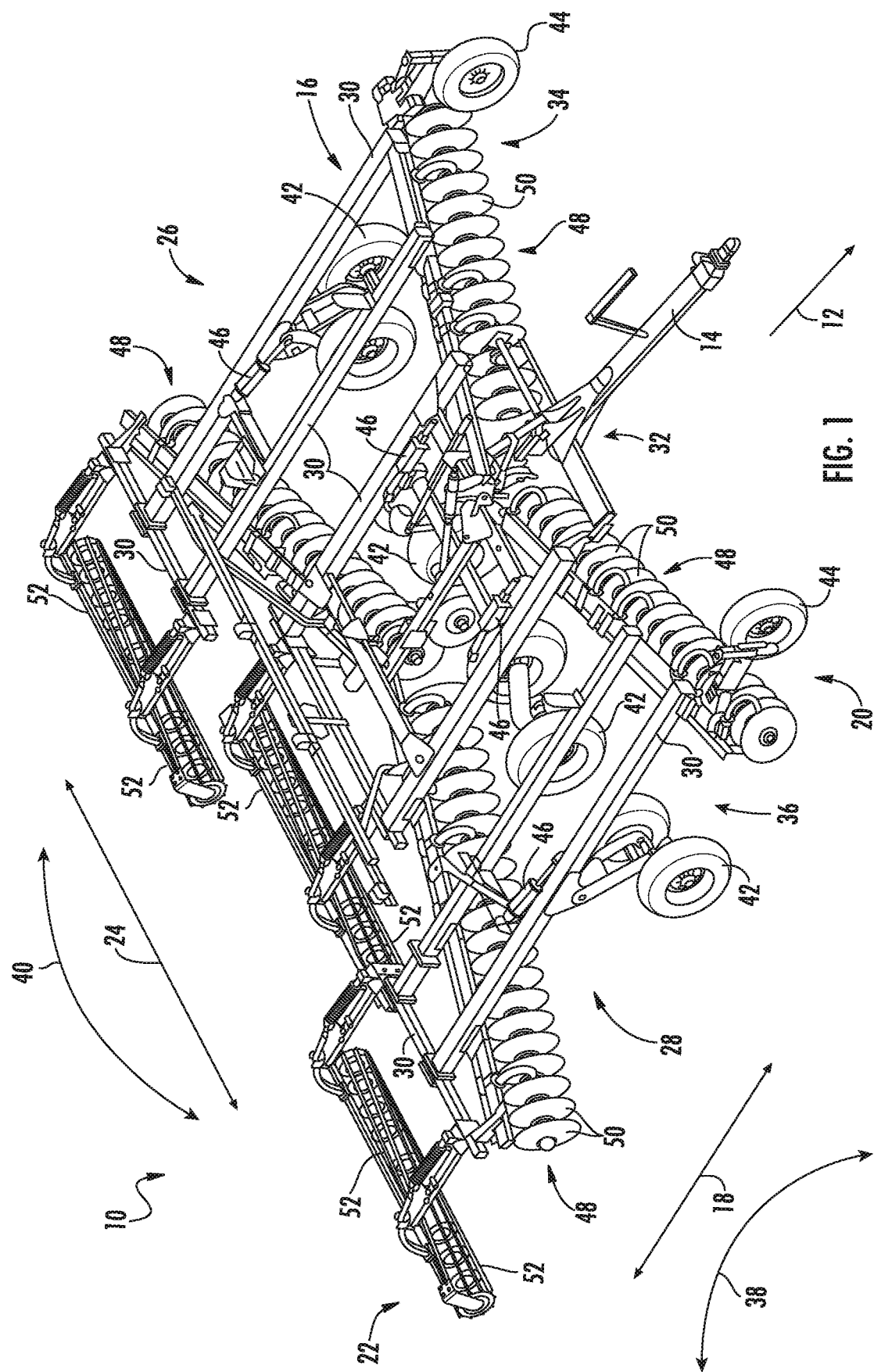
FIG. 1 illustrates a perspective view of one embodiment of an agricultural implement in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for monitoring the frame levelness of an agricultural implement. Specifically, in several embodiments, a controller of the disclosed system may be configured to receive data from seedbed floor sensors of first and second seedbed floor detection assemblies mounted on a frame of the implement. Each seedbed floor sensor may, in turn, detect the position of the corresponding seedbed floor detection assembly relative to the frame, with such position generally being indicative of the vertical profile of the seedbed at the location of the detection assembly. Based on the received data, the controller may be configured to monitor the positions of the first and second seedbed detection assemblies relative to the frame. When the frame is level, the positions of the first and second seedbed floor detection assemblies relative to the frame may generally be the same or similar. However, when the positions of the first and second seedbed floor detection assemblies differ significantly, the frame may be out-of-level. As such, the controller may be configured to determine that the frame is out-of-level when a differential between the monitored positions of the first and second seedbed detection assemblies exceeds a predetermined differential threshold. In such instances, the controller may be configured to initiate one or more control actions, such as notifying an operator of the implement that the frame is out-of-level and/or adjusting one or more operating parameters of the implement in a manner that levels the frame.

The present subject matter will generally be described herein in the context of monitoring the frame levelness of a tillage implement, such as a disc harrow. However, it should be appreciated that the disclosed system and method may also be used to monitor the frame levelness of any suitable agricultural implement, such as a cultivator, a ripper, a planter, a fertilizer, a chisel, and/or the like.

Figure 2:
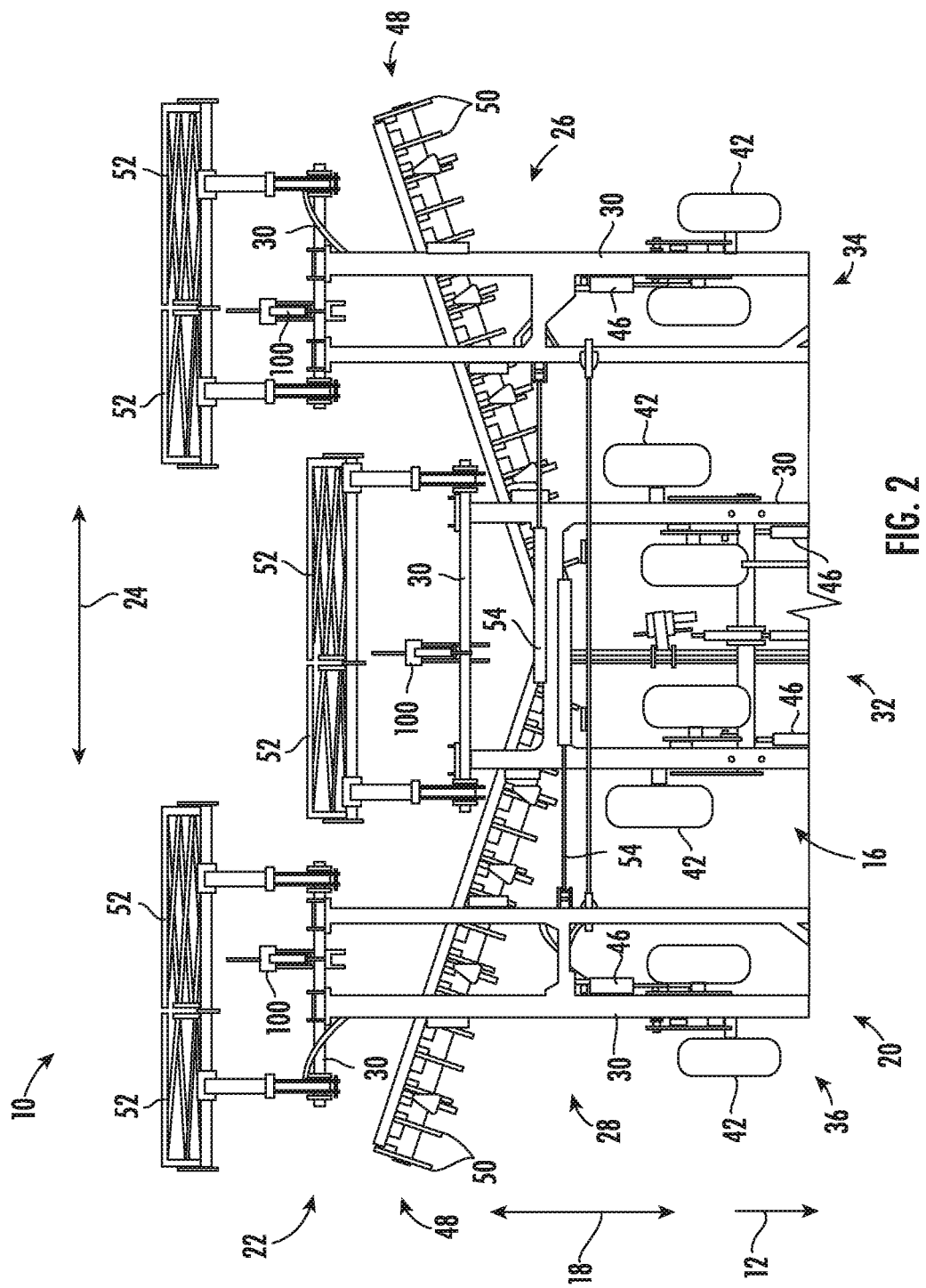
FIG. 2 illustrates a partial top view of the agricultural implement shown in FIG. 1, particularly illustrating a plurality of seedbed floor detection assemblies mounted on the implement.

Referring now to the drawings, FIGS. 1 and 2 illustrate differing views of one embodiment of an agricultural implement 10 in accordance with aspects of the present subject matter. Specifically, FIG. 1 illustrates a perspective view of the agricultural implement 10, particularly illustrating various components of the implement 10. Additionally, FIG. 2 illustrates a partial top view of the implement 10, particularly illustrating a plurality of seedbed floor detection assemblies 100 mounted on the implement 10.

In general, the implement 10 may be configured to be towed along a forward direction of travel 12 by a work vehicle (not shown), such as a tractor or other agricultural work vehicle. For example, the work vehicle may be coupled to the implement 10 via a hitch assembly 14 or using any other suitable attachments means. As shown, the hitch assembly 14 may be coupled to a frame 16 of the implement 10 to facilitate towing the implement 10 in the direction of travel 12.

As shown, the frame 16 may extend in a longitudinal direction (e.g., as indicated by arrow 18 in FIG. 1) between a forward end 20 and an aft end 22. The frame 16 may also extend in a lateral direction (e.g., as indicated by arrow 24 in FIG. 1) between a first side 26 and a second side 28. In addition, the frame 16 may generally include a plurality of structural frame members 30, such as beams, bars, and/or the like, configured to support or couple to a plurality of components.

In several embodiments, the frame 16 may include one or more sections. For example, as shown, in the illustrated embodiment, the frame 16 may include a main or center section 32 positioned centrally between the first and second sides 26, 28 of the frame 16. The frame 16 may also include a first wing section 34 positioned adjacent to the first side 26 of the frame 16. Similarly, the frame 16 may also include a second wing section 36 positioned adjacent to the second side 28 of the frame 16. The first and second wing sections 34, 36 may be pivotably coupled to the main section 32 of the frame 16. In this respect, the first and second wing sections 34, 36 may be configured to fold up relative to the main section 32 to reduce the lateral width of the implement 10 to permit, for example, storage or transportation of the implement 10 on a road. However, in other embodiments, the frame 16 may include any suitable number of frame sections.

As described above, it may be desirable that the frame 16 remains level or substantially level relative to the ground. In general, the levelness of the frame 16 may be defined by the pitch of the frame 16 (e.g., as indicated by arrow 38 in FIG. 1) and/or the roll of the frame 16 (e.g., as indicated by arrow 40 in FIG. 1). More specifically, the pitch 38 of the frame 16 may be a differential in the heights of the forward and aft ends 20, 22 of the frame 16 in the longitudinal direction 18 of the implement 10. That is, the frame 16 may be pitched when the one of the forward or aft ends 20, 22 of the frame 16 is closer to the ground than the other of forward or aft ends 22, 22 of the frame 16. Additionally, the roll 40 of the frame 16 may be a differential in the heights of the first and second sides 26, 28 of the frame 16 in the lateral direction 24 of the implement 10. That is, the frame 16 may be rolled when the one of the first and second sides 26, 28 of the frame 16 is closer to the ground than the other of first and second sides 26, 28 of the frame 16.

The implement 10 may further include various wheel assemblies coupled to the frame 16 to support the frame 16 relative to the ground and to facilitate towing the implement 10 in the direction of travel 12. Specifically, in several embodiments, the implement 10 may include a plurality of center support wheel assemblies 42 located centrally on the frame 16 between its forward and aft ends 20, 22, with the wheel assemblies 42 being spaced apart from one another in the lateral direction 24 of the implement 10 between its first and second sides 26, 28. In addition, the implement 10 may also include a plurality of forward support wheel assemblies 44 coupled to the frame 16 adjacent to the forward end 20 of the frame 16, with the wheel assemblies 44 being spaced apart from one another in the lateral direction 24 of the implement 10 between its first and second sides 26, 28. As shown in FIG. 1, the forward support wheel assemblies 44 may be spaced apart from the center support wheel assemblies 42 in the longitudinal direction 18 of the implement 10. It should be appreciated that the implement 10 may include any suitable number and/or type of wheel assemblies in alternate embodiments.

Furthermore, the implement 10 may include one or more wheel actuators 46. Specifically, each actuator 46 may be configured to adjust the position one of the wheel assemblies, such as one of center support wheel assemblies 42, relative to the frame 16. For example, in one embodiment, a first end of each actuator 46 (e.g., a rod of each actuator 46) may be coupled to the center support wheel assembly 42, while a second end of each actuator 46 (e.g., the cylinder of each actuator 46) may be coupled to the frame 16. The rod of each actuator 46 may be configured to extend and/or retract relative to the corresponding cylinder to adjust the position of the center support wheel assembly 42 relative to the frame 16. In one embodiment, the actuator(s) 46 corresponds to a fluid-driven actuator(s), such as a hydraulic or pneumatic cylinder(s). However, it should be appreciated that the actuator(s) 46 may correspond to any other suitable type of actuator(s), such as an electric linear actuator(s).

Referring still to FIGS. 1 and 2, the implement 10 may also include a plurality of ground-engaging tools supported by the frame 16. For example, in several embodiments, the frame 16 may be configured to support one or more gangs or sets 48 of disc blades 50 at its forward end 20. In such embodiments, each disc blade 50 may, for example, include both a concave side (not shown) and a convex side (not shown). Furthermore, the gangs 48 of disc blades 50 may be oriented at an angle relative to the travel direction 12 to promote more effective tilling of the soil. Additionally, as shown, in one embodiment, the frame 16 may also be configured to support one or more baskets or rotary firming wheels 52 adjacent to its aft end 20. The baskets 52 may, in turn, be configured to reduce the number of clods in the soil and/or firm the soil over which the implement 10 travels.

It should be appreciated that, in addition to the gangs 48 of disc blades 50 and the baskets 52 shown in FIGS. 1 and 2 (or as an alternative thereto), the implement 10 may include any other suitable ground-engaging tools. For instance, if the implement 10 is configured as a cultivator or ripper, the implement 10 may include a plurality shanks, harrow tines, leveling blades, and/or the like. Similarly, if the implement 10 is configured as a planter, the implement 10 may include a plurality of opener discs, closer discs, packer wheels, and/or the like.

Referring particularly to FIG. 2, the implement 10 may include one or more frame actuators 54. Specifically, each actuator 54 may be configured to adjust to the position or orientation of a first section of the frame 16 (e.g., one of the wing sections 34, 36) relative to a second section of the frame 16 (e.g., the center section 32). For example, in one embodiment, a first end of each actuator 54 (e.g., a rod of each actuator 54) may be coupled to the first section of the frame 16, while a second end of each actuator 54 (e.g., a cylinder of each actuator 54) may be coupled to the second section of the frame 16. The rod of each actuator 54 may be configured to extend and/or retract relative to the corresponding cylinder to adjust the position or orientation of the first section of the frame relative to the second section. In one embodiment, the actuator(s) 54 corresponds to a fluid-driven actuator(s), such as a hydraulic or pneumatic cylinder(s). However, it should be appreciated that the actuator(s) 54 may correspond to any other suitable type of actuator(s), such as an electric linear actuator(s).

In accordance with aspects of the present subject, the implement 10 may include a plurality of seedbed floor detection assemblies 100 mounted on its frame 16. In general, and as will be described below, each detection assembly 100 may be configured to capture data indicative of the vertical profile of the seedbed floor of the field across which the implement 10 is traveling. Specifically, in several embodiments, one detection assembly 100 may be coupled to each section 32, 34, 36 of the frame 16. As such, the detection assemblies 100 may be spaced apart from each other in the lateral direction 24. Furthermore, as shown, in the illustrated embodiment, the detection assemblies 100 mounted on the wing sections 34, 36 are spaced apart from the detection assembly 100 mounted on the center section 32 in the longitudinal direction 18. In alternative embodiments, each section 32, 34, 36 may include more than one detection assembly 100, such as two or more detection assemblies 100. Furthermore, in other embodiments, one or more of the sections 36, 38, 40 may not include any detection assemblies 100. In this regard, the implement 10 may include any other suitable number of detection assemblies 100 mounted on the frame 16, such as two or four more detection assemblies 100.

In several embodiments, each detection assembly 100 may be positioned aft of the disc blades 50 and forward of the baskets 52 of the implement 10 relative to the direction of travel 12. For example, as shown, in one embodiment, each detection assembly 100 may be positioned aft of the disc blades 50 and forward of the baskets 52 that are positioned on the same section of the frame 16. However, in alternative embodiments, each detection assembly 100 may be coupled to the frame 16 at any other suitable location. For example, in one embodiment, the detection assemblies 100 may be positioned aft of the disc blades 50 and the baskets 52, such as on an auxiliary support beam (not shown) extending rearwardly from the aft end 20 on the frame 16.

It should be appreciated that the configuration of the implement 10 described above and shown in FIGS. 1 and 2 is provided only to place the present subject matter in an exemplary field of use. Thus, it should be appreciated that the present subject matter may be readily adaptable to any manner of implement configuration.

Figure 3:
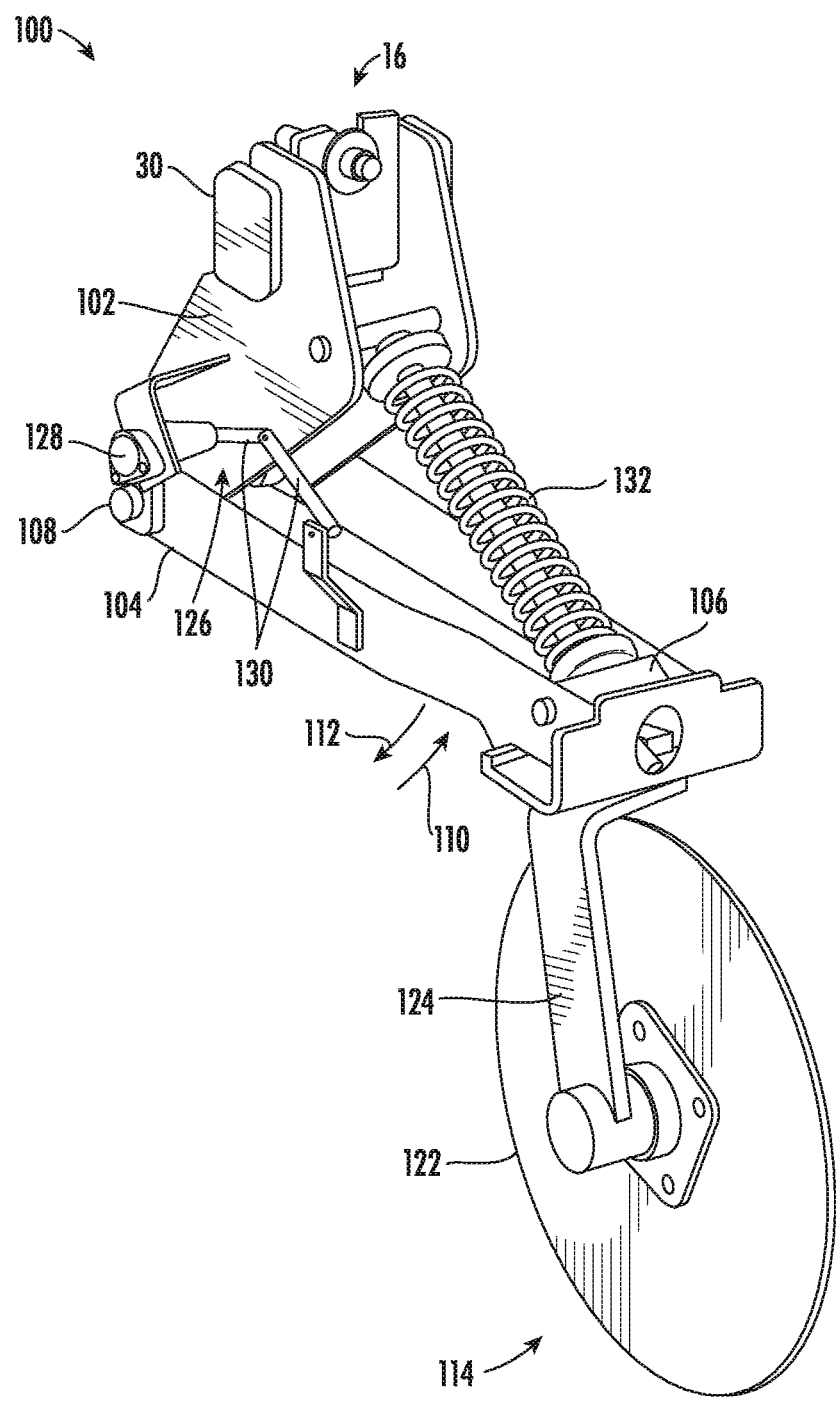
FIG. 3 illustrates a perspective view of one embodiment of a seedbed floor detection assembly in accordance with aspects of the present subject matter.

Referring now to FIG. 3, a perspective view of one embodiment of a seedbed floor detection assembly 100 for use with an agricultural implement is illustrated in accordance with aspects of the present subject matter. In general, the seedbed floor detection assembly 100 will be described herein with reference to the implement 10 described above with reference to FIGS. 1 and 2. However, it should be appreciated by those of ordinary skill in the art that the disclosed seedbed floor detection assembly 100 may generally be utilized with implements having any other suitable implement configuration.

As shown in FIG. 3, the detection assembly 100 may be supported by a portion of the frame 16, such as by coupling the detection assembly 100 to one of the frame members 30 via a bracket 102. In several embodiments, the detection assembly 100 may include one or more pivot arms (e.g., a first pivot arm 104 and a second pivot arm 106) pivotably coupled to the frame member 30 (e.g., via the bracket 102) such that the pivot arms 104, 106 are configured to pivot relative to the frame member 30. For instance, the pivot arms 104, 106 may be pivotably coupled to the frame member 30 at pivot points 108 defined between the pivot arms 104, 106 and the mounting bracket 102. As such, the pivot arms 104, 106 may pivot relative to the frame member 30 about the pivot points 108 (e.g., as indicated by arrows 110, 112 in FIG. 3).

Figure 4:
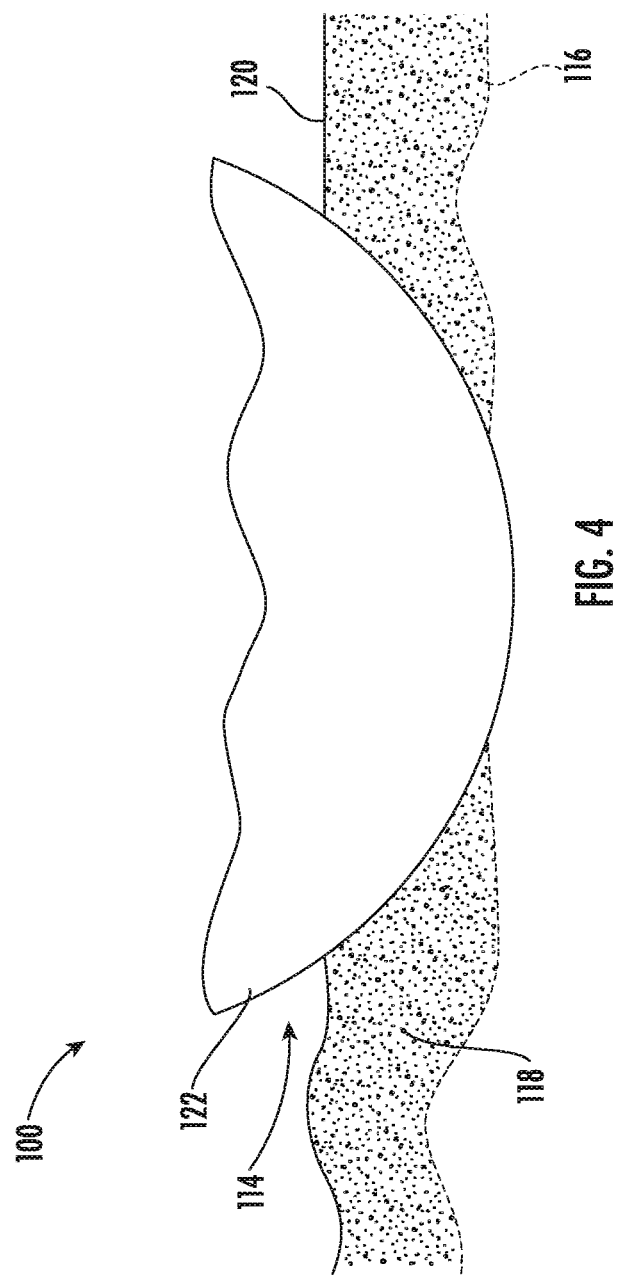
FIG. 4 illustrates a simplified view of a ground-engaging portion of the seedbed floor detection assembly shown in FIG. 3 positioned relative to a floor and an outer surface of a seedbed directly behind an implement following the performance of a field operation.

In addition, the detection assembly 100 may include a seedbed tool 114 coupled to the pivot arms 104, 106. In general, the seedbed tool 114 may be configured to ride along or otherwise contact a floor of a seedbed created by the implement 10 as the implement 10 is being moved through the field, thereby allowing the seedbed tool 114 to follow the contour or profile of the seedbed floor. For instance, as shown in FIG. 4, the seedbed tool 114 may ride along a floor 116 of a seedbed 118 (with the seedbed 118 extending vertically between an outer seedbed surface 120 and the seedbed floor 116) as the implement 10 (and, thus, the detection assembly 100) is moved in the forward travel direction 12. Thus, as the seedbed tool 114 is moved across a portion of the seedbed floor 116 that includes vertically-oriented variations in its profile (e.g., dips or raises in the seedbed floor 116), the seedbed tool 114 may raise or lower relative to the frame member 30 as the tool 114 follows the profile of the seedbed floor 116. Such raising or lowering of the seedbed tool 114 may, in turn, result in the pivot arms 104, 106 pivoting relative to the frame member 30. For instance, as the seedbed tool 114 rises with increases in the vertical profile of the seedbed floor 116, the pivot arms 104, 106 may pivot upwardly about the pivot point 108 in a first direction (e.g., as indicated by arrow 110 in FIG. 3). Similarly, as the seedbed tool 114 lowers with reductions in the vertical profile of the seedbed floor 116, the pivot arms 104, 106 may pivot downwardly about the pivot point 108 in an opposite, second direction (e.g., as indicated by arrow 112 in FIG. 3).

In general, the seedbed tool 114 may correspond to any suitable tool and/or member configured to penetrate through the loosened soil layer forming the seedbed 118 and ride along or otherwise contact the seedbed floor 116 as the implement 10 is moved across the field. In several embodiments, the seedbed tool 114 may correspond to one or more rotary members configured to rotate or roll along the seedbed floor 116. For instance, as shown in the illustrated embodiment, the seedbed tool 114 may correspond to a rotary disc 122 (e.g., a dulled coulter disc) configured to penetrate through the loosened soil of the seedbed 118 and roll along the seedbed floor 116. In such an embodiment, the rotary disc 122 may be coupled to the pivot arms 104, 106 via a suitable support bracket 124 or other suitable mounting means to allow the rotary disc 122 to be rotationally supported relative to the seedbed floor 116. In other embodiments, the seedbed tool 114 may correspond to one or more non-rotary tools, such as a sweep or a tine, configured to penetrate through the loosened soil of the seedbed 118 and contact the seedbed floor 116 as the implement 10 is moved across the field. Furthermore, although the illustrated embodiment of the detection assembly 100 includes a single seedbed tool 114, it should be appreciated that, in alternative embodiments, the detection assembly 100 may include two or more seedbed tools 114.

Referring again to FIG. 3, the detection assembly 100 may also include a seedbed floor sensor 126 configured to detect the position of the seedbed tool 114 relative to the frame member 30 (e.g., by detecting the position of or the pivotable motion of the arms 104, 106). By detecting the position of the pivot arms 104, 106 relative to the frame member 30, the sensor 126 may be configured to indirectly detect the vertical profile of the seedbed floor 116 as the pivot arms 104, 106 pivot due to changes in the vertical positioning of the seedbed tool 114 as such tool 114 rides along the seedbed floor 116. Accordingly, the position of the pivot arms 104, 106 relative to the frame member 30 may be indicative the vertical profile of the seedbed floor 116.

It should be appreciated that the seedbed floor sensor 126 may generally correspond to any suitable sensor or sensing device configured to directly or indirectly detect the position of the seedbed tool 114 relative to the frame member 30. In several embodiments, the seedbed floor sensor 126 may include a rotary sensor 128 (e.g., a rotary potentiometer or a magnetic rotary sensor) coupled to the bracket 102 (which is, in turn, coupled to the frame member 30) or one of the pivot arms 104, 106 and an associated sensor linkage 130 coupled between the rotary sensor 128 and the other adjacent component. For instance, as shown in the illustrated embodiment, the rotary sensor 128 is coupled to a portion of the bracket 102, with the sensor linkage 130 being coupled between the rotary sensor 128 and one of the pivot arms 104, 106. As such, the position of the pivot arms 104, 106 relative to the frame member 30 may be detected by the rotary sensor 128 via the mechanical linkage provided by the sensor linkage 130.

In other embodiments, the seedbed floor sensor 126 may correspond to any other suitable sensor or sensing device configured to detect the position of the seedbed tool 114. For instance, the seedbed floor sensor 126 may correspond to a linear potentiometer, a proximity sensor, and/or any other suitable transducer (e.g., ultrasonic, electromagnetic, infrared, etc.) that allows the position of the pivot arms 104, 106 to be directly or indirectly detected. Furthermore, although the illustrated embodiment of the detection assembly 100 includes a single seedbed floor sensor 126, it should be appreciated that, in alternative embodiments, the detection assembly 100 may include two or more seedbed floor sensors 126.

As shown in FIG. 3, the detection assembly 100 may also include a biasing mechanism 132 configured to bias the seedbed tool 114 in the direction of the seedbed floor 116. For instance, as shown in the illustrated embodiment, the biasing mechanism 132 corresponds to a spring-loaded device coupled between the bracket 102 and the first and second pivot arms 104, 106, respectively. As such, the spring-loaded device may bias the pivot arms 104, 106 away from the bracket 102 and the frame member 30, thereby forcing the seedbed tool 114 downwardly in the direction of the seedbed floor 116. However, in other embodiments, the biasing mechanism 132 may correspond to any other suitable device, such as a spring, a fluid-driven cylinder, or a suitable linear actuator. Furthermore, although the illustrated embodiment of the detection assembly 100 includes a biasing mechanism, it should be appreciated that, in alternative embodiments, the detection assembly 100 may include two or more biasing mechanisms 132.

Figure 5:
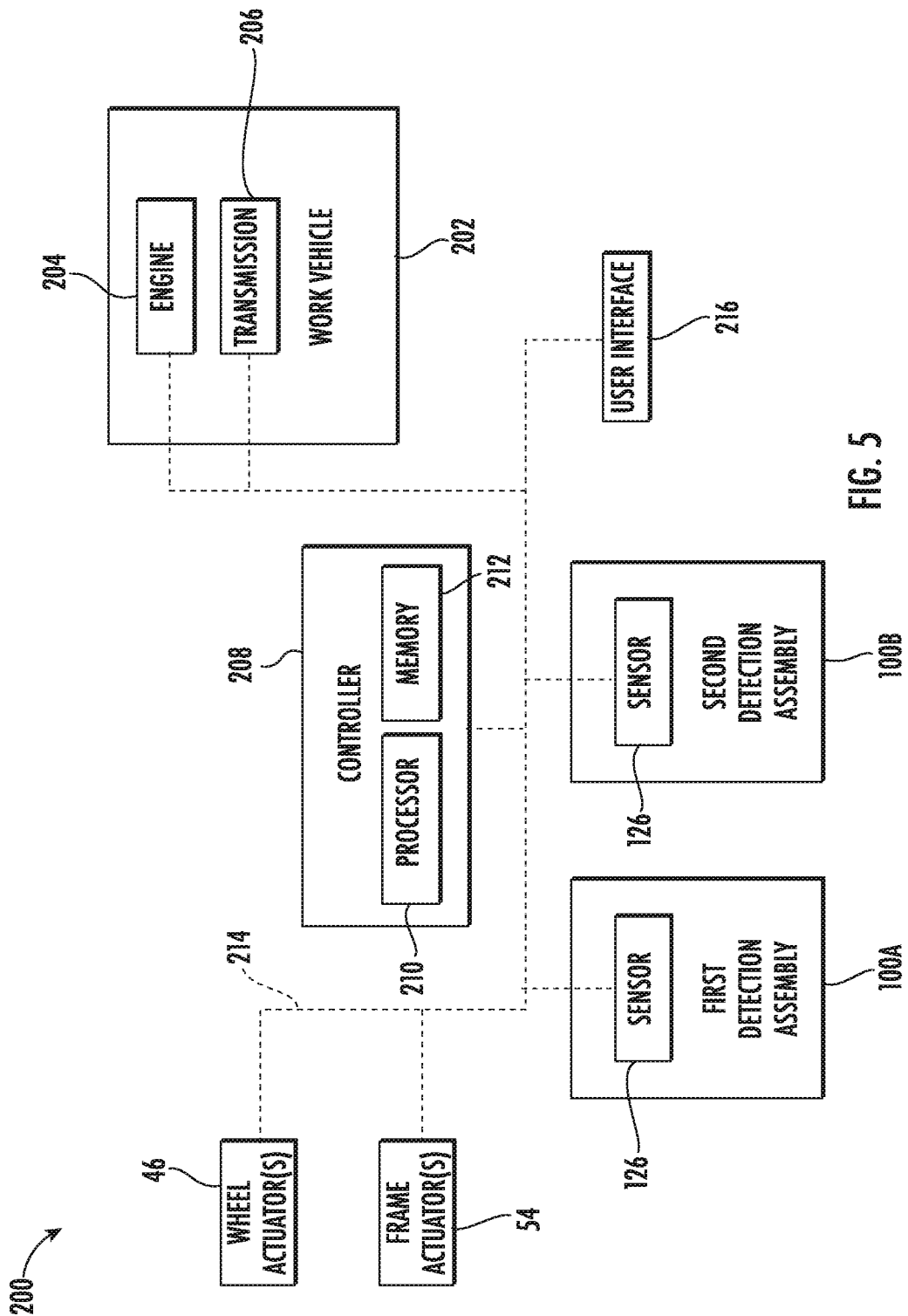
FIG. 5 illustrates a schematic view of one embodiment of a system for monitoring the frame levelness of an agricultural implement in accordance with aspects of the present subject matter.

Referring now to FIG. 5, a schematic view of one embodiment of a system 200 for monitoring the frame levelness of an agricultural implement is illustrated in accordance with aspects of the present subject matter. In general, the system 200 will be described herein with reference to the implement 10 and the seedbed floor detection assembly 100 described above with reference to FIGS. 1-4. However, it should be appreciated by those of ordinary skill in the art that the disclosed system 200 may generally be utilized with implements having any other suitable implement configuration and/or seedbed floor detection assemblies having any suitable assembly configuration.

As shown in FIG. 5, the system 200 may include first and second seedbed floor detection assemblies 100A, 100B of the implement 10. Each detection assembly 100A, 100B may, in turn, include an associated seedbed floor sensor 126 that is configured to monitor the position of the corresponding assembly 100A, 100B relative to the implement frame 16. Furthermore, in one embodiment, the first detection assembly 100A may be mounted on a first section of the frame 16, such as the center section 32. Conversely, the second detection assembly 100B mounted on a second section of the frame 16, such as one of the wing sections 34, 36. However, it should be appreciated that, in alternative embodiments, the detection assemblies 100A, 100B may be positioned at any other suitable locations on the implement 10. Moreover, in some embodiments, the system 200 may include additional detection assemblies 100.

Additionally, the system 200 may include a work vehicle 202, such as a tractor or other agricultural work vehicle, that is configured tow the implement 10 across the field in the direction of travel 12. In this regard, the vehicle 202 may include one or more devices for adjusting the speed at which the implement 10 is moved across the field. For example, the vehicle 202 may include an engine 204 and a transmission 206. In general, the engine 204 may be configured to generate power by combusting or otherwise burning a mixture of air and fuel. The transmission 206 may, in turn, be operably coupled to the engine 204 and may provide variably adjusted gear ratios for transferring the power generated by the engine 204 to wheels (not shown) and/or track assemblies (not shown) of the vehicle 202. For example, increasing the power output by the engine 204 (e.g., by increasing the fuel flow to the engine 204) and/or shifting the transmission 206 into a higher gear may increase the speed at which the implement 10 is moved across the field. Conversely, decreasing the power output by the engine 204 (e.g., by decreasing the fuel flow to the engine 204) and/or shifting the transmission 206 into a lower gear may decrease the speed at which the implement 10 is moved across the field.

In accordance with aspects of the present subject matter, the system 200 may include a controller 208 positioned on and/or within or otherwise associated with the implement 12 or vehicle 202. In general, the controller 208 may comprise any suitable processor-based device known in the art, such as a computing device or any suitable combination of computing devices. Thus, in several embodiments, the controller 208 may include one or more processor(s) 210 and associated memory device(s) 212 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 212 of the controller 208 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 212 may generally be configured to store suitable computer-readable instructions that, when implemented by the processor(s) 210, configure the controller 208 to perform various computer-implemented functions.

In addition, the controller 208 may also include various other suitable components, such as a communications circuit or module, a network interface, one or more input/output channels, a data/control bus and/or the like, to allow controller 208 to be communicatively coupled to any of the various other system components described herein (e.g., the wheel actuator(s) 46, the frame actuator(s) 54, the seedbed floor sensors 126, the engine 204, and/or the transmission 206). For instance, as shown in FIG. 5, a communicative link or interface 214 (e.g., a data bus) may be provided between the controller 208 and the components 46, 54, 126, 204, 206 to allow the controller 208 to communicate with such components 46, 54, 126, 204, 206 via any suitable communications protocol (e.g., CANBUS).

It should be appreciated that the controller 208 may correspond to an existing controller(s) of the implement 10 and/or the vehicle 202, itself, or the controller 208 may correspond to a separate processing device. For instance, in one embodiment, the controller 208 may form all or part of a separate plug-in module that may be installed in association with the implement 10 and/or the vehicle 202 to allow for the disclosed systems to be implemented without requiring additional software to be uploaded onto existing control devices of the implement 10 and/or the vehicle 202. It should also be appreciated that the functions of the controller 208 may be performed by a single processor-based device or may be distributed across any number of processor-based devices, in which instance such devices may be considered to form part of the controller 208. For instance, the functions of the controller 208 may be distributed across multiple application-specific controllers, such as an engine controller, a transmission controller, an implement controller, and/or the like.

Furthermore, in one embodiment, the system 200 may also include a user interface 216. More specifically, the user interface 216 may be configured to provide feedback (e.g., notifications associated with the levelness of the frame 16) to the operator of the implement 10 and/or vehicle 202. As such, the user interface 216 may include one or more feedback devices (not shown), such as display screens, speakers, warning lights, and/or the like, which are configured to provide feedback from the controller 208 to the operator. The user interface 216 may, in turn, be communicatively coupled to the controller 208 via the communicative link 214 to permit the feedback to be transmitted from the controller 208 to the user interface 216. In addition, some embodiments of the user interface 216 may include one or more input devices (not shown), such as touchscreens, keypads, touchpads, knobs, buttons, sliders, switches, mice, microphones, and/or the like, which are configured to receive user inputs from the operator. In one embodiment, the user interface 216 may be positioned within a cab (not shown) of the vehicle 202. However, in alternative embodiments, the user interface 216 may have any suitable configuration and/or be positioned in any other suitable location.

In several embodiments, the controller 208 may be configured to monitor the position of the first and second detection assemblies 100A, 100B relative to the implement frame 16. More specifically, as indicated above, the first and second detection assemblies 100A, 100B may be mounted on the frame 16, with each detection assembly 100A, 100B, in turn, including a seedbed floor sensor 126 configured to detect the position of corresponding assembly 100A, 100B relative to the frame 16. In this regard, the controller 208 may be configured to receive data from the seedbed floor sensors 126 (e.g., via the communicative link 214). Thereafter, the controller 208 may be configured to analyze/process the received data to monitor the positions of the first and second detection assemblies 100A, 100B relative to the frame 16. For instance, the controller 208 may include a look-up table(s), suitable mathematical formula, and/or algorithms stored within its memory 212 that correlates the received data to the positions of the first and second detection assemblies 100A, 100B relative to the frame 16.

Furthermore, in several embodiments, the controller 208 may be configured to determine that the frame 16 is out-of-level based on the monitored positions of the first and second seedbed detection assemblies 100A, 100B. In general, when the frame 16 is level, various ground-engaging tools (e.g., the disc blades 50) mounted on the frame 16 may penetrate the ground to the same or a similar depth. In such instances, the floor of the seedbed being formed by such tools may generally have the same or a similar vertical profile across the longitudinal and/or lateral directions 18, 24 such that the positions of the first and second detection assemblies 100A, 100B relative to the frame 16 are also the same or similar. Conversely, when the frame 16 is out-of-level, the ground-engaging tools may penetrate the outer seedbed surface to varying depths such that the vertical profile of the seedbed differs across the longitudinal and/or lateral directions 18, 24. In such instances, the positions of the first and second detection assemblies 100A, 100B relative to the frame 16 may also differ. As such, the controller 208 may be configured to the compare the determined positions of the first and second detection assemblies 100A, 100B relative to the frame 16 (such as by comparing the positions of the corresponding pivot arms 104, 106 relative to the frame 16) to determine a differential between such positions. Thereafter, when the determined differential exceeds the predetermined differential threshold, the controller 208 may be configured to determine that the frame 16 is out-of-level.

It should be appreciated that the relative positioning of the first and second detection assemblies 100A, 100B may be indicative of how the frame 16 is out-of-level. More specifically, as indicated above, in one embodiment, the detection assemblies 100A, 100B may be spaced apart in the lateral direction 24, such as when the first detection assembly 100A is mounted on the center section 32 of the frame 16 and the second detection assembly 100B is mounted on one of the wing sections 34, 36. In such embodiment, when the positions of the first and second detection assemblies 100A, 100B differ, such a differential between the laterally spaced assemblies 100A, 100B provides an indication that the frame 16 is rolled. Furthermore, in another embodiment, the detection assemblies 100A, 100B may be spaced apart in the longitudinal direction 18, such as when the first detection assembly 100A is mounted adjacent to the forward end 20 the frame 16 and the second detection assembly 100B is mounted adjacent to the aft end 22 of the frame 16. In such embodiment, when the positions of the first and second detection assemblies 100A, 100B differ, such a differential between the longitudinally spaced assemblies 100A, 100B provides an indication that the frame 16 is pitched. As will be described below, the controller 208 may be configured to determine the cause of the pitching or rolling (e.g., misalignment of the frame sections 32, 34, 36 or bouncing of one frame section 32, 34, 36 relative of another frame section 32, 34, 36) based on the duration of the determined differential.

Moreover, it should be appreciated that the predetermined differential threshold used by the controller 208 to compare the determined positions of the first and second detection assemblies 100A, 100B may be selected to prevent the controller 208 from initiating control action(s) when only minor differences exist between the positions. In general, the frame 16 may experience minor amounts of pitch and/or roll as the implement 10 is moved across the field. For example, soil condition changes, rocks, field trash, and/or the like may cause minor amounts of pitch and/or roll. Such minor amounts of pitch and/or roll may be expected and are generally not indicative of poor seedbed quality or the need to adjust an operating parameter(s) of the implement 10 and/or the vehicle 202. As such, the predetermined differential threshold may be a differential between the determined positions of the first and second detection assemblies 100A, 100B that is great enough to be indicative of an amount of frame pitch and/or roll that results in poor seedbed quality or the need to adjust an operating parameter(s) of the implement 10 and/or the vehicle 202.

In one embodiment, the controller 208 may be configured to determine when the frame 16 is out-of-level based on the standard deviations of the positions of the first and second detection assemblies 100A, 100B. Specifically, in such embodiment, the controller 208 may configured to determine the standard deviations of the monitored positions of the first and second seedbed detection assemblies 100A, 100B relative to the frame 16. For instance, the controller 208 may include a look-up table(s), suitable mathematical formula, and/or algorithms stored within its memory 212 that correlates the received data to the standard deviations of the positions of the first and second detection assemblies 100A, 100B. Thereafter, the controller 208 may be configured to compare the standard deviations to determine a differential between such standard deviations. When the determined standard deviation differential exceeds a predetermined differential threshold, the controller 208 may be configured to infer that the frame 16 is out-of-level.

Furthermore, the controller 208 may be configured to determine the cause of the pitching and/or rolling of the frame 16 based on the duration of the differential between the positions of the first and second detection assemblies 100A, 100B. In certain instances, as indicated above, the frame 16 may be out-of-level (e.g., pitched and/or rolled) due to misalignment of the frame sections 32, 34, 36 and/or bouncing of one frame section 32, 34, 36 relative to another frame section 32, 34, 36. More specifically, when the frame 16 is out-of-level due to misalignment of its sections 32, 34, 36, the differential between the positions of the first and second detection assemblies 100A, 100B may generally be present for a prolonged period of time. Conversely, when the frame 16 is out-of-level due to one frame section 32, 34, 36 bouncing relative to another frame section 32, 34, 36, the differential between the positions of the first and second detection assemblies 100A, 100B may generally be present for a brief or momentary period of time. As such, in several embodiments, when it is determined that a differential between the positions of the first and second detection assemblies 100A, 100B that exceeds the predetermined differential threshold is present, the controller 208 may be configured to monitor the time period across which such differential exists. When the position differential dissipates before a predetermined time period has elapsed, the controller 208 may determine that one frame section 32, 34, 36 has bounced relative to another frame section 32, 34, 36. In certain instances, such bouncing may generally not cause poor seedbed quality, such as when the bounces are infrequent (e.g., more than one minute apart). In such instances, the controller 208 may, in one embodiment, simply ignore the differential. More frequent bouncing may, however, be indicative of poor seedbed quality. When the differential persists for at least the predetermined time period, the controller 208 may determine that one or more of the frame sections 32, 34, 36 are misaligned.

Figure 6:
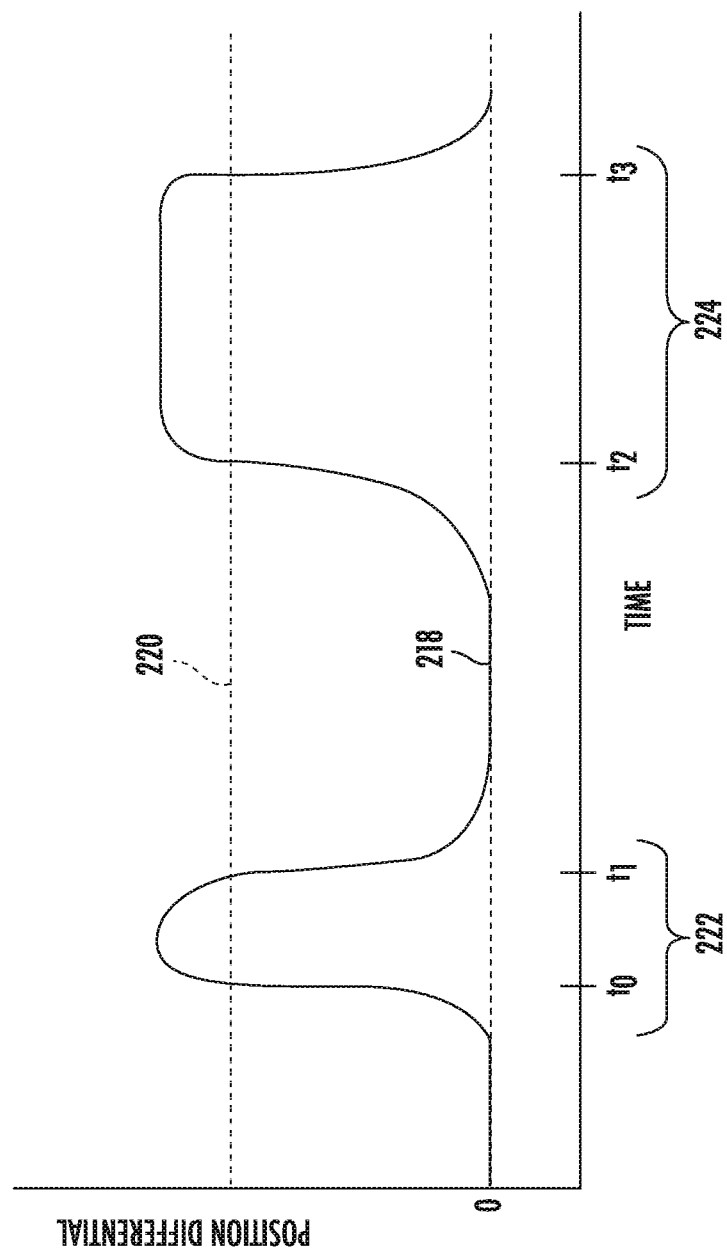
FIG. 6 illustrates a graphical view of an example dataset charting a seedbed floor detection assembly position differential relative a predetermined differential threshold over time in accordance with aspects of the present subject matter.

For instance, FIG. 6 illustrates a graphical view of an example dataset charting a differential between the positions of the first and second detection assemblies 100A, 100B (e.g., as indicated by solid line 218) relative to a predetermined differential threshold (e.g., as indicated by dashed line 220) over time as monitored by the controller 208. As shown in FIG. 4, during various different time periods, the position differential 218 exceeds the predetermined differential threshold, such as during a first time period 222 between time $t_0$ and time $t_1$ and a second time period 224 between time $t_2$ and time $t_3$. In such instances, the controller 208 may be configured to identify the length of each time period and compare it to the predetermined time period. When the length of any of such time periods exceeds the predetermined time period, the controller 208 may determine that the frame 16 is misaligned. For instance, in the example dataset of FIG. 6, it may be assumed that the first time period 222 is less than the predetermined time period, while the second time period 224 exceeds the predetermined time period. In such instance, the position differential 218 occurring across the first time period 222 may be indicative of one frame section 32, 34, 36 bouncing relative to another frame section 32, 34, 36 (e.g., one of the wing sections 34, 36 bouncing relative to the center section 32). In contrast, the position differential occurring across second time period 224 may be indicative of one or more frame sections 32, 34, 36 being misaligned (e.g., one of the wing sections 34, 36 being misaligned relative to the center section 32).

It should be appreciated that the predetermined time period may generally be selected to prevent the controller 208 from determining that the frame 16 is misaligned when the position differential is sufficiently short such that it is indicative of bouncing. For instance, in one embodiment, the predetermined time period threshold may be less than about 2 seconds, such as less than about 1 second or less than about 0.5 seconds.

Referring again to FIG. 5, in several embodiments, when it is determined that the frame 16 is out-of-level, the controller 208 may be configured to initiate one or more control actions. In general, such control action(s) may be associated with or otherwise intended to level the frame 16 or otherwise address the determined differential between the positions of the first and second detection assemblies 100A, 100B. For example, in one embodiment, when it is determined that the frame 16 is out-of-level, the controller 208 may be configured to notify the operator of implement/vehicle 10/202 that the frame 16 is out-of-level. Specifically, in one embodiment, the controller 208 may be configured to transmit instructions to the user interface 216 (e.g., the communicative link 214) instructing the user interface 216 to provide a notification to the operator of the implement/vehicle 10/202 (e.g., by causing a visual or audible notification or indicator to be presented to the operator) indicating that the frame 16 is out-of-level. Such notification may include how the frame 16 is out-of-level (e.g., whether the frame 16 is pitched and/or rolled) and/or why the frame 16 is out-of-level (e.g., whether the frame sections 32, 34, 36 are misaligned and/or one of the frame sections 32, 34, 36 is bouncing). In such instances, the operator may then choose to initiate any suitable corrective action he/she believes is necessary, such as adjusting one or more operating parameters of the implement 10 and/or the associated vehicle 202.

Moreover, in several embodiments, the controller 208 may be configured to automatically adjust one or more operating parameters of the implement 10 and/or the vehicle 202 when the determined the frame 16 is out-of-level. Specifically, in one embodiment, the controller 208 may be configured to initiate adjustment of the height of the frame 16, such as when it is determined that one or more frame sections 32, 34, 36 are misaligned. For example, in such an embodiment, the controller 208 may be configured to transmit instructions to the wheel actuator(s) 46 (e.g., via the communicative link 214) instructing the actuator(s) 46 to adjust the position(s) of the associated wheels 42 relative to the frame 16 in manner that levels the frame 16. Furthermore, the controller 208 may be configured to initiate adjustment of the relative positioning of the frame sections 32, 34, 36, such as when it is determined that one or more frame sections 32, 34, 36 are misaligned. For example, the controller 208 may be configured to transmit instructions to the frame actuator(s) 54 (e.g., via the communicative link 214) instructing the actuator(s) 54 to adjust the relative positioning of the associated frame sections 32, 34, 36 in manner that levels the frame 16. Additionally, in one embodiment, the controller 208 may be configured to transmit instructions to the frame actuator(s) 54 (e.g., via the communicative link 214) instructing the actuator(s) 54 to adjust the down pressure being applied to the corresponding wing section 34, 36 relative to the center section 32, such as when one of the frame sections 32, 34, 36 is bouncing.

Furthermore, in one embodiment, the controller 208 may be configured to automatically adjust the ground speed at which the implement 10 is being moved across the field when it is determined that the frame 16 is out-of-level. Specifically, the controller 208 may be configured to transmit instructions to the engine 204 and/or the transmission 206 of the work vehicle 202 (e.g., via the communicative link 214) instructing the engine 204 and/or the transmission 206 to adjust their operation. For example, the controller 208 may instruct the engine 204 to vary its power output and/or the transmission 206 to upshift or downshift to increase or decrease the ground speed of the vehicle 202 and the implement 10 in a manner that levels the frame 16. For example, when it is determined that one of the frame sections 32, 34, 36 is bouncing, the controller 208 may instruct the engine 204 to decrease its power output and/or the transmission 206 to downshift to decrease the ground speed of the vehicle 202 and the implement 10 such that the bouncing is reduced. However, it should be appreciated that, in alternative embodiments, the controller 208 may be configured to transmit instructions to any other suitable components (e.g., braking actuators) of the vehicle 202 and/or the implement 10 such that the ground speed of the vehicle 202 and/or the implement 10 is adjusted.

Figure 7:
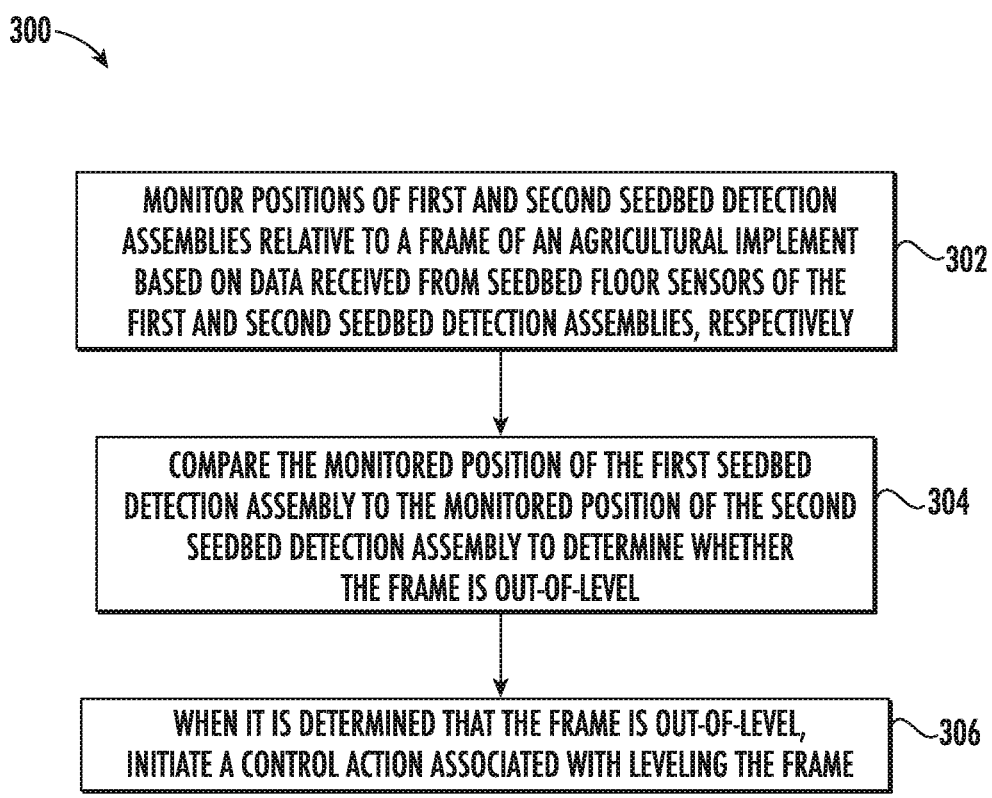
FIG. 7 illustrates a flow diagram of one embodiment of a method for monitoring the frame levelness of an agricultural implement in accordance with aspects of the present subject matter.

Referring now to FIG. 7, a flow diagram of one embodiment of a method 300 for monitoring frame levelness of an agricultural implement is illustrated in accordance with aspects of the present subject matter. In general, the method 300 will be described herein with reference to the agricultural implement 10, the seedbed floor detection assembly 100, and the system 200 described above with reference to FIGS. 1-6. However, it should be appreciated by those of ordinary skill in the art that the disclosed method 300 may generally be implemented with any implement having any suitable implement configuration, any seedbed floor detection assembly having any suitable assembly configuration, and/or any system having any suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 7, at (302), the method 300 may include monitoring, with a computing device, positions of first and second seedbed detection assemblies relative to a frame of an agricultural implement based on data received from seedbed floor sensors of the first and second seedbed detection assemblies, respectively. For instance, as described above, the controller 208 may be configured to monitor the positions of first and second seedbed detection assemblies 100A, 100B of an agricultural implement 10 relative to a frame 16 of the implement 10 based on data received from seedbed floor sensors 126 of the detection assemblies 100A, 100B, respectively.

Additionally, at (304), the method 300 may include comparing, with the computing device, the monitored position of the first seedbed detection assembly to the monitored position of the second seedbed detection assembly to determine whether the frame is out-of-level. For instance, as described above, the controller 208 may be configured to compare the monitored position of the first detection assembly 100A to the monitored position of the second detection assembly 100B to whether the frame 16 is out-of-level.

Moreover, as shown in FIG. 7, at (306), when it is determined that the frame is out-of-level, the method 300 may include initiating, with the computing device, a control action associated with leveling the frame. For instance, as described above, when it is determined that the frame 16 is out-of-level, the controller 208 may be configured to initiate one or more control actions, such as adjusting one or more operating parameters of the implement 10 and/or an associated work vehicle 202. Such operating parameters may include the ground speed of the implement/vehicle 10/202, the position(s) of a wheel assembly(ies) 42 relative to the frame 16, and/or the relative positioning of frame sections 32, 34, 36.

It is to be understood that the steps of the method 300 are performed by the controller 208 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 208 described herein, such as the method 300, is implemented in software code or instructions which are tangibly stored on a tangible computer readable medium. The controller 208 loads the software code or instructions via a direct interface with the computer readable medium or via a wired and/or wireless network. Upon loading and executing such software code or instructions by the controller 208, the controller 208 may perform any of the functionality of the controller 208 described herein, including any steps of the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for monitoring a frame levelness of an agricultural implement, the system comprising:
   an implement frame;
   first and second seedbed detection assemblies coupled to the implement frame, each of the first and second seedbed detection assemblies comprising:
      a seedbed tool configured to ride along a seedbed floor as the implement frame is moved across a field in a forward travel direction, the seedbed extending downwardly within the field from an outer seedbed surface to the seedbed floor; and
      a seedbed floor sensor configured to capture data indicative of a position of the seedbed tool relative to the implement frame; and
   a controller communicatively coupled to the seedbed floor sensors of the first and second seedbed detection assemblies, the controller configured to:
      monitor positions of the first and second seedbed detection assemblies relative to the implement frame based on data received from the seedbed floor sensors of the first and second seedbed detection assemblies, respectively;
      determine standard deviations of the monitored positions of the first and second seedbed detection assemblies; and
      when a differential between the determined standard deviations exceeds a predetermined standard deviation threshold, determine that the implement frame is out-of-level.

2. The system of claim 1, wherein the controller is further configured to compare the monitored position of the first seedbed detection assembly to the monitored position of the second seedbed detection assembly to determine whether the implement frame is out-of-level.

3. The system of claim 2, wherein the controller is further configured to initiate a control action associated with leveling the implement frame when it is determined that the implement frame is out-of-level.

4. The system of claim 3, wherein the control action comprises notifying an operator of a work vehicle pulling the implement frame across the field that the implement frame is out-of-level.

5. The system of claim 3, further comprising:
   a plurality of wheels coupled to the implement frame and configured to support the implement frame relative to the outer seedbed surface, the control action comprising adjusting a position of a wheel of the plurality of wheels relative to the implement frame.

6. The system of claim 3, wherein the implement frame further comprises a first section and a second section pivotably coupled to the first section, the control action comprising adjusting a position of one of the first section or the second section relative to the other of the first section or the second section.

7. The system of claim 1, wherein the implement frame comprises a first section and a second section pivotably coupled to the first section, the first seedbed floor detection assembly mounted on the first section of the implement frame, the second seedbed floor detection assembly mounted on the second section of the implement frame.

8. The system of claim 7, wherein the first section corresponds to a center section of the implement frame and the second section corresponds to a wing section of the implement frame.

9. The system of claim 7, wherein the controller is further configured to:
monitor a time period across which the differential between the monitored positions of the first and second seedbed detection assemblies exceeds the predetermined differential threshold; and
when the monitored time period exceeds a threshold time period, determine that the first section and the second section are improperly aligned.

10. The system of claim 9, wherein the controller is further configured to determine that one of the first section or the second section is bouncing relative to the other of the first section or the second section when the monitored time period falls below the threshold time period.

11. The system of claim 1, wherein the implement frame extends along a lateral direction between a first side and a second side, the first seedbed detection assembly being spaced apart from the second seedbed detection assembly along the lateral direction.

12. The system of claim 1, wherein each of the seedbed tools of the first and second seedbed detection assemblies comprises a rotary member configured to roll along the seedbed floor as the implement frame is moved across the field in the forward travel direction.

13. The system of claim 1, wherein each of the first and second seedbed floor detection assemblies further comprises a pivot arm pivotably coupled to the implement frame, each of the seedbed tools of the first and second seedbed floor detection assemblies being coupled to the corresponding pivot arm, each of the first and second seedbed floor sensors of the first and second seedbed detection assemblies comprising a rotary sensor coupled to one of the corresponding pivot arm or the implement frame and a sensor linkage coupled between the corresponding rotary sensor and the other of the corresponding pivot arm or the implement frame.

* * * * *